United States Patent
Dooley

(10) Patent No.: US 7,212,159 B2
(45) Date of Patent: May 1, 2007

(54) POSITIONING SYSTEM, APPARATUS AND METHOD

(75) Inventor: Saul R. Dooley, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/540,101

(22) PCT Filed: Dec. 9, 2003

(86) PCT No.: PCT/IB03/05893

§ 371 (c)(1),
(2), (4) Date: Jun. 20, 2005

(87) PCT Pub. No.: WO2004/057365

PCT Pub. Date: Jul. 8, 2004

(65) Prior Publication Data

US 2006/0082502 A1 Apr. 20, 2006

(51) Int. Cl.
*G01S 3/02* (2006.01)

(52) U.S. Cl. .................................. 342/453; 342/463
(58) Field of Classification Search ............... 342/387, 342/442, 450, 453, 463; 340/993
See application file for complete search history.

(56) References Cited

U.S. PATENT DOCUMENTS

| | | | | |
|---|---|---|---|---|
| RE31,509 E | * | 1/1984 | Neidell | 342/108 |
| 4,746,924 A | * | 5/1988 | Lightfoot | 342/453 |
| 5,534,876 A | * | 7/1996 | Erickson et al. | 342/387 |
| 6,133,876 A | * | 10/2000 | Fullerton et al. | 342/375 |
| 6,580,393 B2 | * | 6/2003 | Holt | 342/453 |
| 2002/0196187 A1 | * | 12/2002 | Holt | 342/453 |

* cited by examiner

*Primary Examiner*—Dao Phan
(74) *Attorney, Agent, or Firm*—Paul Im

(57) ABSTRACT

A positioning system, apparatus and method include a transmitter (2), a receiver (4) and a plurality of reflectors (6). A signal is transmitted from transmitter to receiver both directly and via the reflectors (6). A location server (8) calculates the unknown position of the transmitter or receiver by identifying signal components (40) with reflectors (6).

14 Claims, 3 Drawing Sheets

POSITIONING SYSTEM, APPARATUS AND METHOD

Figure 1:
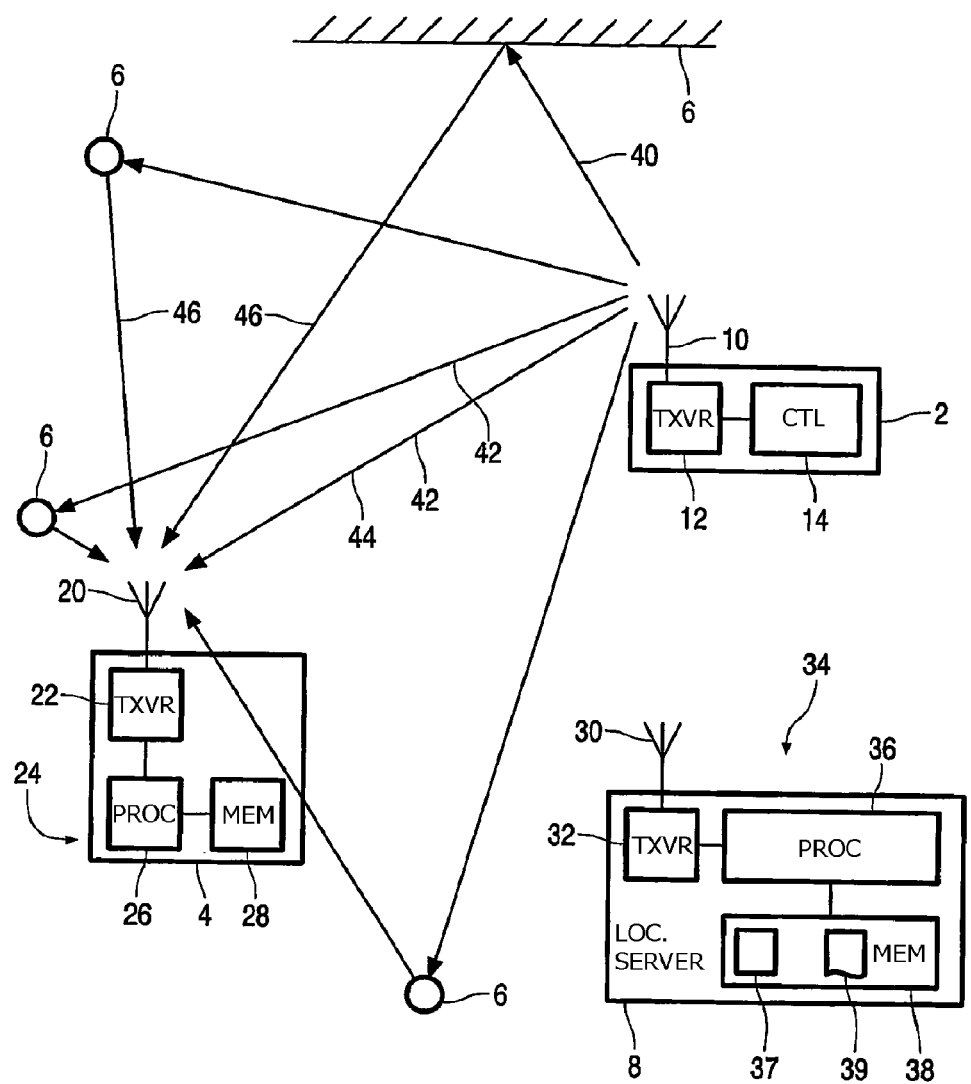

The invention relates to a positioning system, apparatus and a method of positioning, and in particular to a system, apparatus and method suitable for use indoors.

The range between a transmitter and a receiver can be measured by transmitting a signal between the transmitter and the receiver, measuring the time of flight of the signal and calculating the range from the signal's speed. If the departure time is measured by a clock on the transmitter and the arrival time measured by a clock on the receiver, then the range calculated from the departure time subtracted from the arrival time will only be accurate if the clocks are accurately synchronised. Otherwise, the calculated range will be a "pseudorange", defined as the measured time offset multiplied by the signal speed.

To measure position accurately in three dimensions, the pseudoranges between a mobile unit and a number of base stations are used. In general, if the mobile unit clock has an unknown time offset, four pseudoranges are used, because the positioning problem has four unknowns, namely the position in the x, y and z directions and the clock offset between the transmitter and receiver.

For example, in the Global Positioning System (GPS) radio signals are received in a GPS receiver from four satellites to enable accurate positioning to take place since the GPS receiver will have an unknown clock offset from the satellites. If the problem is only two dimensional, i.e. to obtain a position on the floor of a room, then only three base stations are required.

However, the requirement of more than one base station is inconvenient, and it would be much more convenient to require only one transmitter or base station.

One approach to positioning is use Cell ID, where the mobile unit is proximate to a base station and the mobile unit position simply uses the base station position as its own. For example, if this were applied to Bluetooth beacons with a range of 30 m, then the positioning accuracy would be 30 m. This level of positioning accuracy is not generally acceptable, especially indoors. Moreover, a system able to discriminate between a number of different positions requires the same number of base stations as the number of different positions and thus this approach does not in practice reduce the number of base stations required.

Another approach to positioning is "Multipath fingerprinting". For example, the US Wireless Corp has proposed a multipath fingerprinting system for use with mobile phones. At the time of writing some details are provided on the website http://www.uswcorp.com. In brief, a mobile phone makes a call and the signals from the mobile phone are received at a base station. As a result of multipath effects, particularly reflections off buildings in a city environment, the signals from the mobile phone arrive at the base station as a number of different components of varying signal strength and time delay. The basestation measures the signal strength and time delay of these components. The base station is connected to a database which contains the possible values of these parameters for each location within range of the base station, for example to a resolution of 5 m. The base station calculates the best fit between the measured received components and the values stored in the database to estimate the mobile phone position. This system is believed to be accurate to about 100 m.

However, the system requires an accurate database of multipath components and this in turn requires a mobile unit to be taken to each possible location within range and for measurements to be made of the time delay and signal strength of the components of signal strength received in the transmitter for each possible location. This is time consuming and accordingly expensive, and likely to be prohibitively expensive in a system for use indoors. Moreover, if changes are made to the environment, the measurements need to be repeated.

Accordingly, there remains a need for a positioning system that minimises the number of basestations required.

According to the invention there is provided a positioning method using a transmitter device having a transmitter and a receiver device having a receiver, a first one of which is a reference device at a known position and the other of which is a test device at an unknown position, using a number of reflectors at known positions, the method comprising transmitting a signal from the transmitter to the receiver, the signal having a number of signal components travelling from the transmitter to the receiver via the reflectors or directly;

receiving a plurality of the signal components of the transmitted signal in the receiver;

measuring the arrival times of the signal components;

identifying the signal components with reflectors off which the signal component has reflected; and calculating the unknown position by fitting the measured arrival times of the signal components to the known positions of the identified reflectors and the position of the reference device.

Unlike multipath fingerprinting, the method according to the invention does not require experimental determination of the multipath fingerprint from each location within range followed by a comparison of the measured fingerprint to that previously recorded at each location to determine the best fit.

Instead, the method uses a knowledge of the positions of a number of reflectors. By identifying the signal components with the reflectors the known positions of the reflectors can be used to calculate the unknown position.

In preferred embodiments, the method involves testing a plurality of permutations of identifications of components with reflectors and identifying the permutation that gives the best fit.

Each possible permutation may be tested in turn. This is the simplest approach.

Alternatively, the method may include selecting a subset of the possible permutations and testing the permutations of each permutation in the selected subset in turn.

In particular, the method may include measuring in the receiver the angle of arrival of the signal components, and selecting the subset of permutations based on the angle of arrival information.

The best fit may simply use the received times of the signal components. Alternatively, the best fit calculation may include attempting to work out the unknown position for each permutation and excluding permutations that do not give a solution or that give a solution that is unlikely or bizarre. For example, knowledge of the dimensions of the room or area the receiver is in constrains the solution to being in that room or area, so solutions not in that room or area may be rejected. Thus, the steps of identifying components and calculating the unknown position may be repeated for a number of permutations and a combination of a plausible or likely unknown position and good fit with the measured arrival times selected as the best fit.

As well as measuring the arrival times of the components, the method may include measuring the signal strength of the received signal components, wherein the step of identifying the components with the reflectors includes fitting the received signal strengths to expected values of received signal strengths. This may be done using a prior knowledge of the size and reflectivity of each reflector.

It is necessary to measure the arrival times of a number of separate signal components. This may be done in a number of known ways. However, an ultra-wideband signal is particularly suitable for such measurements, since the larger the signal bandwidth the easier it is to determine multipath components and times of arrival accurately. Accordingly, preferred embodiments include transmitting an ultra-wideband signal as the transmitted radio frequency signal.

The transmitter may transmit periodically. In this way, the unknown position may be determined regularly.

In another aspect, there is provided a positioning system for use in an environment having a plurality of reflectors at known positions, comprising:

a transmitter for transmitting a signal;

a receiver for receiving a plurality of signal components of the transmitted signal, each signal component being received either directly from the transmitter or indirectly off a reflector, the receiver comprising means for measuring the arrival times of the signal components; and a location server comprising means for storing the known position of one of the transmitter and receiver and for storing the known position of a plurality of reflectors, and means for identifying a plurality of received signal components with respect to the reflectors off which the respective signal components were reflected and calculating the unknown position of the other of the transmitter and receiver by fitting the measured arrival times of the received signal components to the stored known positions.

According to a further aspect of the invention there is provided a location server for calculating the unknown position of one of a transmitter or a receiver from measured arrival times at the receiver of a plurality of received signal components resulting from a signal transmitted by the transmitter, the location server comprising means for storing the known position of one of the transmitter and receiver and for storing the known position of a plurality of reflectors, and means for identifying a plurality of received signal components with respect to the reflectors off which the respective signal components were reflected and calculating the unknown position of the other of the transmitter and receiver by fitting measured arrival times of the received signal components to the stored known positions.

The connection between receiver and location server may be direct or through any means such as Bluetooth, 802.11b etc. Indeed, in embodiments the location server can be co-located with part of the receiver.

In the case that the location server is separated from the mobile unit, the location server may track the mobile unit, in which case the transmitter should transmit periodically.

The transmitter also may be linked to the network.

In embodiments the transmitter, not the receiver, may be co-located with the location server.

Figure 2:
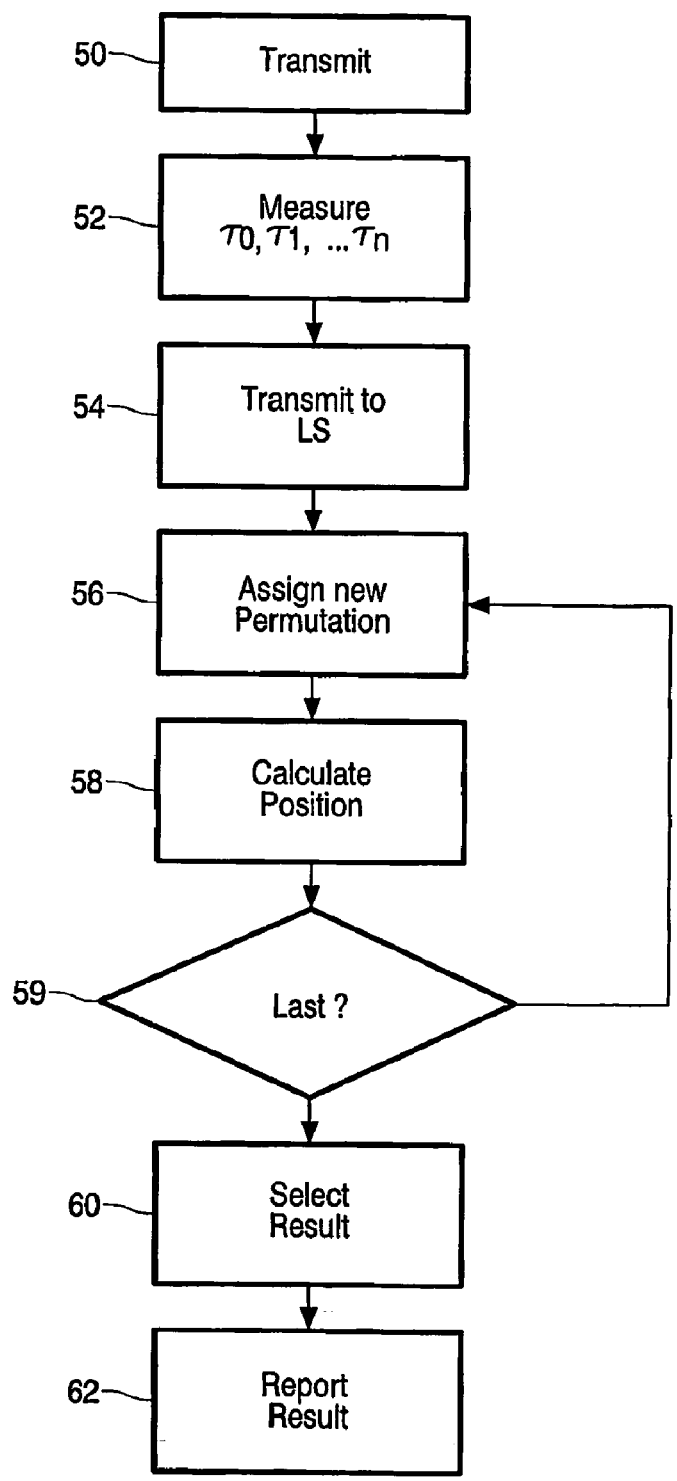
Figure 3:
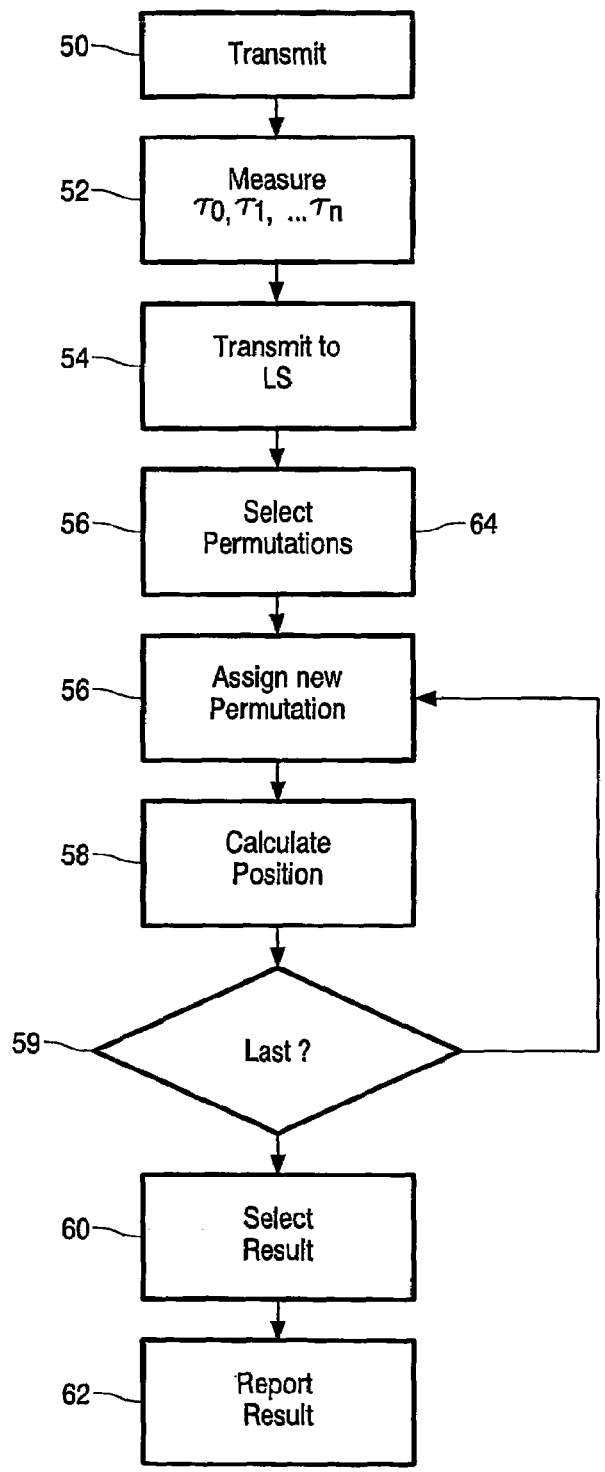

Specific embodiments of the invention will now be described, purely by way of example, with reference to the accompanying drawings in which:

FIG. 1 shows a schematic diagram of a system in accordance with the invention, and FIG. 2 shows a flow diagram of the operation of a first embodiment of the invention; and FIG. 3 shows a flow diagram of the operation of a second embodiment of the invention.

Referring to FIG. 1, a transmitter 2 is arranged in an indoor environment. The transmitter 2 has an antenna 10, a transceiver 12 and a control system 14.

A number of reflectors 6 are provided at known positions. These reflectors may include natural features of the indoor environment, such as walls, as well as deliberately positioned radio frequency reflectors mounted at selected locations.

A receiver 4 of unknown position has an antenna 20, a transceiver 22 and a control system 24 including a processor 26 and memory 28.

A location server 8 is provided, having a control system 34 including processor 36 and memory 38. The memory 38 contains a database 39 listing the locations of the transmitter 2 and the reflectors 6, and code 37 for carrying out the location calculation. The location server 8 needs to communicate with the receiver 4, and in the embodiment shown the location server has its own antenna 30 and transceiver 32.

In alternative embodiments, the location server 8 could be connected to the transmitter 2 through a network and can communicate to the receiver 4 via the transmitter. Alternatively, the location server 8 could be integrated into either the transmitter 2 or receiver 4 by including the necessary code 37 and the reflector location data 39 in the transmitter 2 or receiver 4.

In use, an ultra-wideband signal 40 is transmitted (step 50) from the antenna 10 of the transmitter 2. The use of such a signal makes it easier to determine arrival times of signal components. Those skilled in the art will readily understand "ultra-wideband". In particular, the signal may preferably have a bandwidth of greater than 500 MHz.

The receiver 4 picks up a number of components 42 of this signal. One of the components 42 is a direct component 44 that travels directly from transmitter 2 to receiver 4, the other components 42 being indirect components 46 that travel via reflectors 6.

The receiver 4 determines (step 52) the time of arrival of these components 42. The skilled person will be aware of several methods of resolving the components and determining arrival times, so this will not be described further. Possibilities include a RAKE receiver for spread spectrum signals or ultra-wide bandwidth signals, or a software-based correlator, such as those described in textbooks such as J G Proakis, "Digital Communications", $3^{rd}$ edition, published by McGraw-Hill. The receiver 4 then transmits (step 54) the times to the location server 8. The code 37 in the location server 8 then operates to calculate the position of the receiver 4.

It should be noted that it is not necessary to measure the arrival time of each component. There may be many components, many very weak. All that is required is to measure the arrival time of a number of significant components.

The first component to arrive will be the direct component 44 and the later components will be indirect components 46.

Let $\tau_0$ be the measured arrival time of the direct component 44 and $\tau_i$ (i=1, 2, ... n) be the measured arrival times of the n indirect components 46 that are to be considered further. These may be, for example the ten most significant components. Let $(X_T, y_T)$ be the known position of the transmitter, and let $(x_j, y_j)$ (j=1, 2, ... N) be the known positions of the N reflectors. If each reflector generates exactly one signal component then n=N but this is not essential. Let the time offset between the clocks on the transmitter and receiver be $t_c$. Let the unknown receiver position be $(x_U, y_U)$. The speed of light is c.

The equation governing the time of arrival $\tau_0$ of the direct component 44 is $$c\tau_0 = \sqrt{(x_T - x_U)^2 + (y_T - y_U)^2} + ct_c \qquad (1)$$

The equation governing the time of arrival and $\tau_i$ (i=1, 2, ... n) of the n indirect components 46 is $$c\tau_i = \sqrt{(x_T-x_i)^2+(y_T-y_i)^2} + \sqrt{(x_i-x_U)^2+(y_i-y_U)^2} + ct_c \quad (2).$$

Although these equations are presented as two dimensional, the skilled person will readily be able to extend them to three dimensions.

If the positions $(x_i, y_i)$ of the reflectors of the signals i=1 ... n were known these equations could readily be solved for $(x_U, y_U)$ by any of a number of known methods, such as Manolakis' method, or particularly, Newton's method. If more components are measured than required to solve the equations, i.e. more than 3 components for three unknowns as above $(x_u, y_u, t_c)$ a least squares technique may be used—this latter technique is the technique used in the GPS system. The problem is that the above equations are in terms of the reflector positions for the n signal components (i=1. . . n) and it will not immediately be known which of the n signal components correspond to which of the N reflectors (j=1. . . N).

It is thus necessary to determine which of the components do correspond to which of the reflectors.

In accordance with the first embodiment of the invention, this is carried out by assigning (step 56) the n signal components to the N reflectors in a first permutation and attempting to calculate (step 58) the unknown position based on this assignment. This step is then repeated (step 59) for each of the (n,N) permutations of n signal components with N reflectors. For example, if n=N=5, there will be 5!=120 hypotheses to check.

For each permutation, the location server then determines (step 60) whether the result (if any) is plausible. Often, the result will not be. Plausibility can be determined from the result. If there are more equations than unknowns, then as mentioned above a least squares method can be used to find a solution. In the latter case, plausibility may also be determined by a statistical measure of the compatibility of the equations. Thus, frequently there will only be one permutation that gives a plausible result. Knowing that the user is in range of the transmitter allows the selection of the best result. The result that lies closest to the transmitter position may be selected in the unlikely event that more than one set of equations gives a solution.

This result is then transmitted (step 62) back to the receiver 4, if the information is required there, or to some other location if required.

In a variation of this embodiment, the receiver 4 measures the signal strengths of the received signal components 42 and the step of determining whether the result is plausible (step 60) includes determining the likelihood of the received signal strengths being associated with the particular reflectors to select a suitable solution. This may include using a priori knowledge of the reflectivity and size of the reflectors 6.

In a further embodiment (FIG. 3), the number of permutations is reduced from the initial (n,N) before solving the equations. Thus, a further step (step 64) of selecting suitable permutations is carried out before assigning permutations and carrying out calculations. In one approach the signal strength information is used to carry out the selection step 64.

In a preferred version of this approach, the receiver measures angle of arrival information of each of the signal components 42. The location server 8 then uses this information to select (step 64) likely permutations of reflectors and signal components.

In alternative arrangements, the transmitter position may be unknown and the receiver position known. The same approaches can still be used.

The invention is not restricted to use indoors, but may also be used outdoors in environments where suitable reflectors exist or may be placed.

Any suitable signal may be used, including in particular a radio signal or an ultrasound signal.

From reading the present disclosure, other variations and modifications will be apparent to persons skilled in the art. Such variations and modifications may involve equivalent and other features which are already known in the design, manufacture and use of positioning systems and which may be used in addition to or instead of features described herein. Although claims have been formulated in this application to particular combinations of features, it should be understood that the scope of disclosure also includes any novel feature or any novel combination of features disclosed herein either explicitly or implicitly or any generalisation thereof, whether or not it mitigates any or all of the same technical problems as does the present invention.

The invention claimed is:

1. A positioning method using a transmitter device having a radio frequency transmitter and a receiver device having a receiver, a first one of which is a reference device at a known position and the other of which is a test device at an unknown position, using a number of passive reflectors at known positions, the method comprising transmitting a signal from the transmitter to the receiver, the signal having a number of signal components travelling from the transmitter to the receiver via the reflectors or directly; receiving a plurality of the signal components of the transmitted signal in the receiver; measuring the arrival times of the signal components; identifying the signal components with the reflectors off which the signal component has reflected; and calculating the unknown position of the receiver device by mathematically finding an acceptably close fit of the measured arrival times of the signal components to the known positions of the identified reflectors and the position of the reference device.

2. A positioning method according to claim 1 including testing a plurality of possible permutations of assignments of the signal components to the reflectors and identifying the permutation of assignments of the signal components to the reflectors off which the signal component has reflected that gives a best fit of calculated arrival times to the measured arrival times of the signal components and/or that allows a solution of the unknown position and/or that gives the best fit of calculated unknown position to likely unknown position.

3. A positioning method according to claim 2 wherein each possible permutation of identifications of the signal components with the reflectors is tested in turn.

4. A positioning method according to claim 2 further including selecting a subset of the possible permutations and testing the permutations of the selected subset in turn.

5. A positioning method according to claim 4 including measuring in the receiver the angle of arrival of the signal components, and selecting the subset of permutations based on the angle of arrival information.

6. A positioning method according to claim 1 further comprising measuring the signal strength of the received signal components, wherein the step of identifying the signal components with the reflectors includes fitting received signal strengths to expected values.

7. A positioning method according to claim 1 wherein the signals are radio frequency signals.

8. A positioning method according to claim 7 including transmitting an ultra-wideband signal as the transmitted radio frequency signal.

9. A positioning method according to claim 1 wherein the step of calculating the unknown position of the transmitter or receiver from the measured arrival times is carried out by solving the simultaneous equations $$c\tau_0 = \sqrt{(x_T - x_R)^2 + (y_T - y_R)^2} + ct_c$$

$$c\tau_i = \sqrt{(x_T - x_i)^2 + (y_T - y_i)^2} + \sqrt{(x_i - x_R)^2 + (y_i - y_R)^2} + ct_c \text{ for } i = 1 \ldots n$$

where: $\tau_0$ is the measured arrival time of the direct signal component;

$\tau_i$ ($i = 1, 2, \ldots n$) are the measured arrival times of the n indirect signal components;

$(X_T, Y_T)$ is the position of the transmitter;

$(X_R, y_R)$ is the position of the receiver;

$(x_i, y_i)$ ($i = 1, 2, \ldots n$) are the positions of the reflectors identified with the ith signal component; $t_c$ is the unknown clock offset of the receiver clock relative to the transmitter clock; and c is the speed of light.

10. A positioning system for use in an environment having a plurality of reflectors at known positions, comprising; a transmitter for transmitting a signal; a receiver for receiving a plurality of signal components of the transmitted signal, each signal component being received either directly from the transmitter or indirectly off a reflector, the receiver being arranged to measure the arrival times of the signal components; and a location server comprising means for storing the known position of one of the transmitter and receiver and for storing the known position of a plurality of reflectors, and means for identifying a plurality of received signal components with respect to the reflectors off which the respective signal components were reflected and calculating the unknown position of the other of the transmitter and receiver by mathematically finding an acceptably close fit of the measured arrival times of the received signal components to the stored known positions.

11. A location server for calculating the unknown position of one of a transmitter or a receiver from measured arrival times at the receiver of a plurality of received signal components resulting from a signal transmitted by the transmitter, the location server comprising means for storing the known position of one of the transmitter and receiver and for storing the known position of a plurality of reflectors, and means for identifying a plurality of received signal components with respect to the reflectors off which the respective signal components were reflected and calculating the unknown position of the other of the transmitter and receiver by mathematically finding an acceptably close fit of measured arrival times of the received signal components to the stored known positions.

12. A location server as claimed in claim 11, further comprising the transmitter.

13. A location server as claimed in claim 11, further comprising the receiver.

14. A location server as claimed in claim 11 implemented in an integrated circuit.

* * * * *